Sept. 13, 1927.

M. MARCUS

SPEED INDICATOR

Filed April 1, 1925

Inventor
Myron Marcus.
by: Hazard and Miller
Attys.

Patented Sept. 13, 1927.

1,642,617

UNITED STATES PATENT OFFICE.

MYRON MARCUS, OF LOS ANGELES, CALIFORNIA.

SPEED INDICATOR.

Application filed April 1, 1925. Serial No. 20,021.

This invention relates to speed indicators.

An object of the invention is to provide a speed indicator comprising substantially a driven wheel, means for driving the wheel, and a ball weight operating within the wheel and adapted to slide in a chamber outwardly by centrifugal force against the action of a spring of predetermined tension and to engage a contact out on the periphery of the wheel when a predetermined revolutionary speed has been attained, an electric signal circuit being established by the contact between the contact member and the ball weight.

The particular application of the invention herein illustrated is in combination with a motor vehicle, wherein the speed indicator is installed on the instrument board and the revolving wheel is driven through a flexible shaft by the wheel of the vehicle, the driving mechanism being similar to that of a conventional speedometer. The principal object is to show the driver when he has reached or passed a predetermined speed.

Other objects and advantages will be made manifest from the following specification of an embodiment of the invention illustrated in the accompanying drawing, in which Figure 1 is a front view of the instrument board of a motor vehicle with the speed indicator placed thereon.

Figure 1:
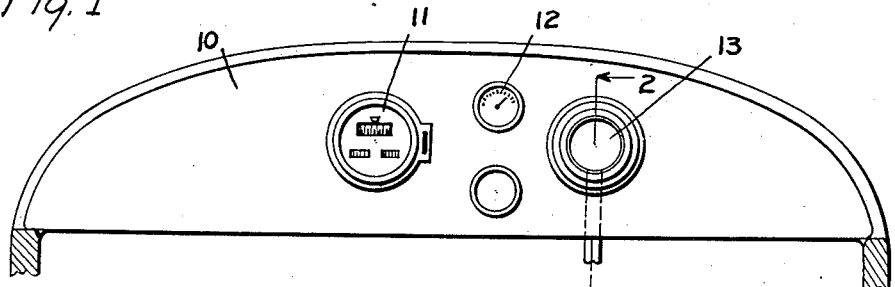

The details of construction and operation of the invention are as follows:

Upon the instrument board 10 of a motor vehicle not herein shown, a conventional speedometer 11 is mounted and also an ammeter 12. A speed indicator 13 hereinafter described is shown as mounted upon the instrument board upon the same plane as the speedometer 11.

The speed indicator comprises a housing 14 provided with an annular seat 15 in which a reflector 16 is adapted to seat and an annular flange 17 is adapted to seat upon the instrument board and to be retained thereon by screws 18. A lens 19 is disposed outwardly from the reflector 16 and a cushioning element 20 is interposed between the edge of the lens and an annular rim 21 which is screwed to the flange 17 for the purpose of retaining the lens and reflector in place.

An electric light 22 is carried in a socket 23 positioned centrally in the reflector 16, one side of the lamp circuit is connected to the wire 24 which leads to the brush assembly 25 hereinafter described.

A partition 26 divides the interior of the housing 14 being firmly secured in place by screws 27 threaded through the housing and into a flange formed on the periphery of the partition.

A ring 28 of comparatively small diameter extends centrally from the partition 26, enclosing a bearing 29, in which one end of a shaft 30 is adapted to rotate. The bearing 29 is inhibited from rotation by a pin 31 extending through the ring 28 and the bearing 29.

The brush assembly 25 comprises a binding post, the screw of which extends through the partition 26 being insulated therefrom by washers 32 and firmly securing a resilient brush member 33 which is adapted to ride upon a contact hereinafter described.

The inner end of the housing 14 consists of a closure member 34 which is secured by screws to the central portion of the housing and supports a second bearing 35 co-extensive with the bearing 29. The closure member 34 has mounted upon it at the lower side a bracket 36 which carries a housing 37 in which a flexible shaft 38 is adapted to rotate. The flexible shaft 38 may be driven by a small gear 39 working from a sprocket 40 of a vehicle wheel 41.

Rigidly mounted upon the shaft 30 is a wheel 42 which is provided on its forward face with a commutator ring 43 upon which the resilient brush member 33 is adapted to constantly ride. The commutator 43 is imbedded in an annular insulating block 44 to insure its insulation from the wheel 42.

The wheel 42 is formed with a cylindrical chamber 45 radially extending and a metallic ball 46 adapted to neatly slide within the cylindrical chamber normally sliding at the inner end of the chamber adjacent the shaft 30. Upon a periphery of the wheel 42 and closing the end of the chamber 45 is an insulating block 47 through which a contact screw or plug member 48 is threaded. A wire 49 leads from the brush assembly 25 to the contact 48, the said contact extending inwardly of the chamber 45 and being enclosed except at the end, by an insulating sleeve 50. An expansion coil spring 51 of predetermined tension extends between the insulating block 47 and the ball 46, being adapted to yieldably retain the ball separated from the end of the contact member 48, but sufficiently yielding to permit the said ball when forced outwardly by the centrifugal of a predetermined revolutionary speed of the wheel, to contact with the screw or contact plug 48.

Upon the face of the wheel 42 opposite the commutation 43 is formed a small bevelled gear 52 which is adapted to be driven by a pinion 53 carried at the upper end of the flexible shaft 38.

Figure 2:
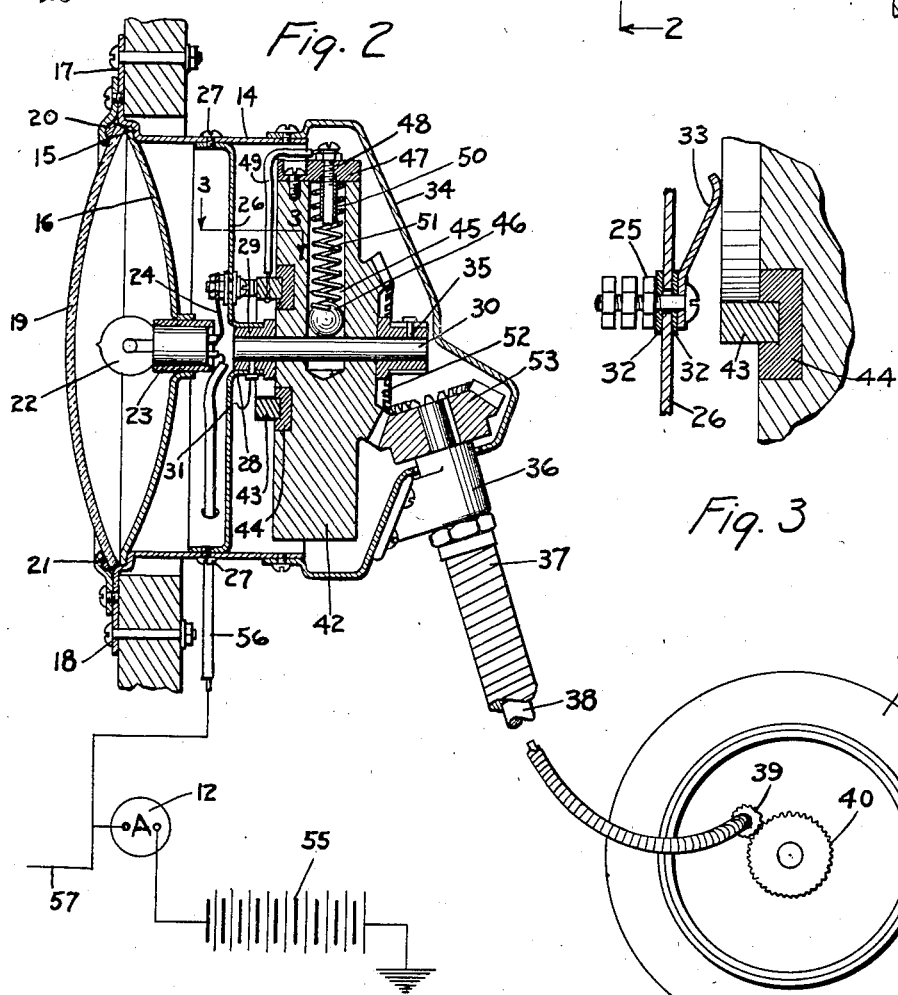
Figure 2 is a vertical sectional view of the speed indicator taken on the line 2—2 of Figure 1.
Figure 3:
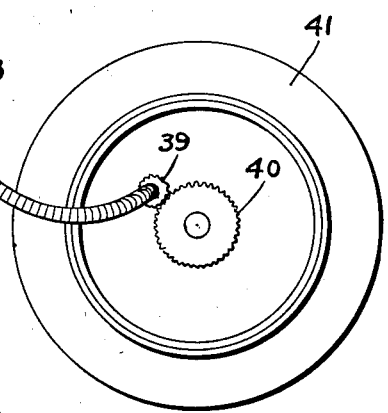
Figure 3 is a fragmentary section of a brush assembly within the speed indicator taken on the line 3—3 of Figure 2.

The ammeter 12 and a battery 55 are diagrammatically illustrated in Figure 2 to show an outline of an electric circuit through the signal light 22.

The operation of the invention may be understood as follows:

The wheel 42 is driven by the pinion 53 working from the shaft 38 and engaging with the bevelled gear 52. At a low speed of the car the wheel 42 will run at a correspondingly low speed and the ball weight 46 will be held out of engagement with the contact 48 by the pressure of the spring 51.
When the car reaches or exceeds a predetermined speed the ball weight 46 will move outwardly by centrifugal force and engage the contact 48. An electric circuit will then be established from the battery 55 through the ammeter 12, through the line 56 to the opposite side of the lamp from the wire 24, then through the lamp and wire 24, through the brush 25 and commutator 43, through the wire 49 to the contact 48 then through the ball 46, wheel 42 and shaft 30 and finally to the housing 14 which is grounded upon the frame of the car. This circuit is a branch of the main line 57 of the car.

Thus I have produced a speed indicator which will turn on a light and show the driver when he has reached or passed a predetermined speed, the indicator being connected to and driven by a wheel of the car in the same manner as the speedometer and the electric circuit being closed by centrifugal force acting upon a ball against the spring which opens the circuit when the centrifugal force decreases.

Various changes may be made without departing from the spirit of my invention as claimed.

I claim:

1. In a speed indicator, a substantially cylindrical housing, a transverse partition secured therein, a lamp on one side of said partition, a bearing member secured to the partition, on the side opposite the lamp, a shaft rotatable therein, a wheel mounted on the shaft to rotate therewith, said wheel having a radial chamber open at the outer end and having a commutator on one face imbedded in insulating material, a contact plug inserted in the open end of the radial chamber and held on the periphery of the wheel by an insulating block, an electrical lead from the commutator to the plug contact, a brush mounted on the partition, an electrical conducting member mounted in the radial chamber, a spring tensioned to allow engagement of said conducting member and the contact plug at high speeds of rotation and to break said contact at low speeds of rotation, said conducting member forming a ground with the wheel, and means adapted to rotate the wheel from a moving part of a vehicle and a wire connected to the brush and in circuit with said lamp and with the ground.

2. A speed indicator comprising in combination a substantially cylindrical housing, a transverse partition, an electric light on one side of the partition, a rotatable wheel and means mounting said wheel on the other side of the partition, means operatively connected to a moving part of the vehicle to rotate the said wheel, a centrifugally operated circuit closer mounted in the said wheel, a circuit including said circuit closer through the lamp and through the said wheel to a part of the vehicle as a ground.

3. A speed indicator comprising in combination a housing, a transverse partition therein, an electric lamp on one side of the partition, a rotatable wheel and means mounting said wheel on the other side of the partition, said wheel having an insulating commutator, a brush on the partition engaging the commutator, a wire leading from the brush to the lamp, a centrifugally actuated circuit closer mounted in the wheel, a circuit through the commutator, the lamp and through the wheel and part of a vehicle to a ground and means to rotate the wheel adapted to be connected to a moving part of a vehicle.

4. A speed indicator as claimed in claim 3, in which the circuit closer comprises a cylindrical radial chamber in the wheel open at the periphery of the wheel, a contact plug inserted in the open end of the radial chamber and insulated from the wheel, a conducting ball in the radial chamber, adapted to form a contact with the structure of the wheel and a spring bearing against the ball adapted to allow engagement of the ball and the plug contact at high speeds and to break said connection at low speeds of rotation of the wheel.

In testimony whereof I have signed my name to this specification.

MYRON MARCUS.